United States Patent
Gruener

(10) Patent No.: US 8,335,613 B2
(45) Date of Patent: Dec. 18, 2012

(54) DETERMINATION OF A CORRECTING VARIABLE FOR CONTROLLING A MOMENT REGULATOR IN A VEHICLE STEERING SYSTEM

(75) Inventor: Stefan Gruener, Auenwald (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/317,535

(22) Filed: Oct. 19, 2011

(65) Prior Publication Data
US 2012/0035811 A1  Feb. 9, 2012

Related U.S. Application Data

(63) Continuation of application No. PCT/EP2010/052369, filed on Feb. 25, 2010.

(30) Foreign Application Priority Data

Apr. 29, 2009  (DE) .................. 10 2009 002 703

(51) Int. Cl.
*A01B 69/00* (2006.01)
(52) U.S. Cl. ........................................ 701/41
(58) Field of Classification Search ........ 701/22, 701/36, 41, 54, 87
See application file for complete search history.

(56) References Cited

U.S. PATENT DOCUMENTS

| | | | |
|---|---|---|---|
| 5,473,539 A | 12/1995 | Shimizu et al. | |
| 6,640,923 B1 | 11/2003 | Dominke et al. | |
| 7,036,626 B2 | 5/2006 | Niessen et al. | |
| 2004/0084241 A1 | 5/2004 | Niessen et al. | |
| 2005/0102082 A1* | 5/2005 | Joe et al. | 701/54 |
| 2008/0305923 A1* | 12/2008 | Tabata et al. | 477/3 |

FOREIGN PATENT DOCUMENTS

| | | |
|---|---|---|
| DE | 4342451 | 7/1994 |
| DE | 100 32 340 | 1/2002 |
| DE | 101 15 018 | 11/2002 |
| DE | 10 2006 057 880 | 6/2008 |
| DE | 10 2007 042 874 | 3/2009 |
| WO | WO-02/076806 | 10/2002 |

* cited by examiner

*Primary Examiner* — Kim T Nguyen
(74) *Attorney, Agent, or Firm* — Jordan and Hamburg LLP

(57) ABSTRACT

So as to provide, with high accuracy, an actuating variable for actuating a torque control element in an electric vehicle steering system and achieve this with reduced complexity as compared to the known methods and devices, an actual torsion-bar torque ($M_D$) is detected, a differential torque is found from a predefined target torsion-bar torque ($M_{D,ref}$) and the actual torsion-bar torque ($M_D$), and the actuating variable is determined by means of an output feedback controller, as a function of the differential torque.

12 Claims, 3 Drawing Sheets

DETERMINATION OF A CORRECTING VARIABLE FOR CONTROLLING A MOMENT REGULATOR IN A VEHICLE STEERING SYSTEM

BACKGROUND OF THE INVENTION

The invention relates to a method for determining an actuating variable for actuating a torque control element in an electric vehicle steering system, wherein the actuating variable is determined as a function of a predefined target torsion-bar torque.

The invention further relates to a control device for controlling a steering system in a vehicle, wherein the steering system comprises a torque control element, and wherein the control device comprises means for actuating the torque control element by means of an actuating signal and means for determining the actuating signal as a function of a predefined target torsion-bar torque.

The invention further relates to a computer program that can be executed on a control device for controlling a steering system, and more particularly on a microprocessor in the control device.

With electric servo steering, an actuating force is applied by a driver to a steering means, such as a steering wheel, so as to change or maintain a current steering angle. Using an electric motor, an assistance force or an assistance torque is generated, which amplifies the actuating force applied by the driver. The assistance torque thus determined is stabilized using additional measures, for example so as to prevent undesirable sudden changes in torque.

The actuating force, or the actuating torque, can notably be amplified as a function of the actuating torque so that less amplification is implemented, for example, when an actuating torque is particularly high, than when the actuating torque is low, and conversely.

A method is known from DE 101 15 018 A1 for operating an electric power-assisted steering system, wherein an actuating signal for actuating the electric motor is determined from the current state of the steering system by means of a state regulator so as to implement torque-free steering. To this end, a state observation element is connected upstream of the state regulator and monitors the state variables of the steering system, and based thereon determines input variables that are suitable for the state regulator. The state variables of the steering system that are used include a pinion-side angle velocity, an angle difference between the steering wheel and pinion side, an angle velocity difference between the steering wheel and pinion side, and a current torque generated by the electric motor. The actuating variable thus determined allowed torque-free steering to be realized, but initially disturbance variables were not considered. So as to ultimately allow disturbance variables to be considered as well, a disturbance variable observation element for determining disturbance states is provided in the known steering system, wherein the torque applied by the driver, or friction moments acting on the steering system, are regarded as the disturbance states.

The final actuating signal is then determined based on the actuating signal that allows torque-free steering, by feeding forward the disturbance variables and feeding forward a predefinable target torsion-bar torque. So as to avoid complex measurement of the state variables in the steering system, or so as to allow states that cannot be measured to be taken into consideration, a model of the steering system is used for estimating the non-measurable state variables. The estimated state variables of the steering system thus correspond to the behavior of the model of the steering system.

The accuracy of the actual torsion-bar torque, which is adjusted by means of the known system, thus decisively depends on the measurement or estimation of the system state variables and the disturbance variables. The disturbance variables, or the torque that is determined as a function of the disturbance variable observation element and fed forward for determination of the actuating variable, compensates for deviations from the assumed model behavior, in the real steering system. The accuracy of the determination of the actuating variable is thus dependent on the quality of compensation for deviations from the model behavior by the real steering system. Moreover, the accuracy is dependent on the quality of the selected model.

SUMMARY OF THE INVENTION

It is the object of the invention to provide an option for determining an actuating variable which allows for the most precise target torsion-bar torque possible.

The object is achieved by a method of the sort mentioned above, by detecting an actual torsion-bar torque, finding a differential torque from the target torsion-bar torque and the actual torsion-bar torque, and determining the actuating variable by means of an output feedback controller, as a function of the differential torque.

An output feedback controller allows the steering system to be controlled without having knowledge of the entire state of the steering system. Rather, a small number of measured variables suffice. To begin with, it is particularly advantageous if only the actual torsion-bar torque to be controlled is measured. While with known methods it is only possible to control the torsion-bar torque as a result of considering the disturbance variables by feeding them forward, and by feeding forward the target torque, with the method according to the invention, based simply on the measured actual torsion-bar torque, the torsion-bar torque can to be adjusted with particularly high accuracy, by way of achieving actual control of the torsion-bar torque based on a comparison of the target torsion-bar torque to the actual torsion-bar torque. As compared to the prior art known from DE 101 15 018 A1, the method according to the invention moreover has the advantage that no explicit estimation or measurement of system state variables or disturbance variables is required. The method according to the invention can further be carried out without state variable observers and without disturbance variable observers.

In the method according to the invention, accuracy is increased by adjustment to the target torsion-bar torque in the method according to the invention, without necessitating indirect approaches using torque-free steering.

The method according to the invention further has the advantage that the output feedback controller can be designed based on requirements in terms of the behavior of the closed loop circuit. Thus, requirements in terms of the dynamic and static behavior of deviations between the target torsion-bar torque and actual torsion-bar torque can be established and implemented directly. Thus, when using an output feedback controller, a model of the steering system, or detection or estimation of state variables and disturbance variables, need not be taken into consideration. The method according to the invention therefore not only allows for increased accuracy in the actual torsion-bar torque established, but also reduces complexity in creating a system for determining actuating variables for actuating the electric motor.

Preferably, the actual torsion-bar torque is filtered, and instead of the actual torsion-bar torque, the filtered actual torsion-bar torque is used to find the differential torque. This allows the disturbance behavior to be found separately. For example, brief changes in the actual torsion-bar torque can be ignored so that these disturbances do not initially cause any change in the actuating variables.

It is also advantageous for the target torsion-bar torque to be filtered and for the filtered target torsion-bar torque, rather than the target torsion-bar torque, to be used for finding the differential torque. As with filtering the actual torsion-bar torque, the control behavior can be found separately by filtering the target torsion-bar torque, without requiring manipulation of individual parameters of the output feedback controller.

According to a further advantageous embodiment, the actual torsion-bar torque and the target torsion-bar torque are fed to the output feedback controller, and the differential torque is generated in the output feedback controller. This allows for a particularly compact implementation of the output feedback controller, because no additional external operations must be carried out in order to provide the required input signals. Moreover, the target torsion-bar torque and the actual torsion-bar torque can thus be taken into consideration independently of each other in the output feedback controller, whereby further increased accuracy is achieved for the actuating variable that is to be generated.

According to a preferred embodiment of the method according to the invention, the actuating variable is additionally determined as a function of a current value of the actuating variable. For this purpose, the current value of the actuating variable can be fed to the controller externally, or it can be fed back internally as an input variable. This allows external limitations on the actuating variable to be taken into consideration. It also makes it possible to consider any subsequent external control of the torque control element, for example so as to realize a desired manual torque beyond the measurement range of a manual torque sensor.

The object is also achieved by a control device of the type mentioned above, by way of the control device comprising means for finding a differential torque from the target torsion-bar torque and an actual torsion-bar torque, and by way of the control device being provided with an output feedback controller, with the actuating variable being determined by this controller as a function of the differential torque. The control device according to the invention notably comprises means for carrying out the method according to the invention.

It is particularly advantageous to implement the method according to the invention in the form of a computer program, which can be executed on a control device for controlling a steering system in a vehicle, and notably on a microprocessor in the control device, which is programmed to carry out the method according to the invention. In this case, the invention is implemented by the computer program, and thus this computer program represents the invention in the same manner as the method does, the computer program being programmed for the execution thereof. The computer program is preferably stored on a memory element. The memory element used can notably be an optical, electric or magnetic storage medium, for example a digital versatile disk (DVD), a hard drive, a random access memory, a read-only memory, or a flash memory.

Additional characteristics, possible applications and advantages of the present invention will be apparent from the following description of exemplary embodiments of the invention, which will be described based on the drawings.

DESCRIPTION OF THE PREFERRED EMBODIMENTS

Figure 1:
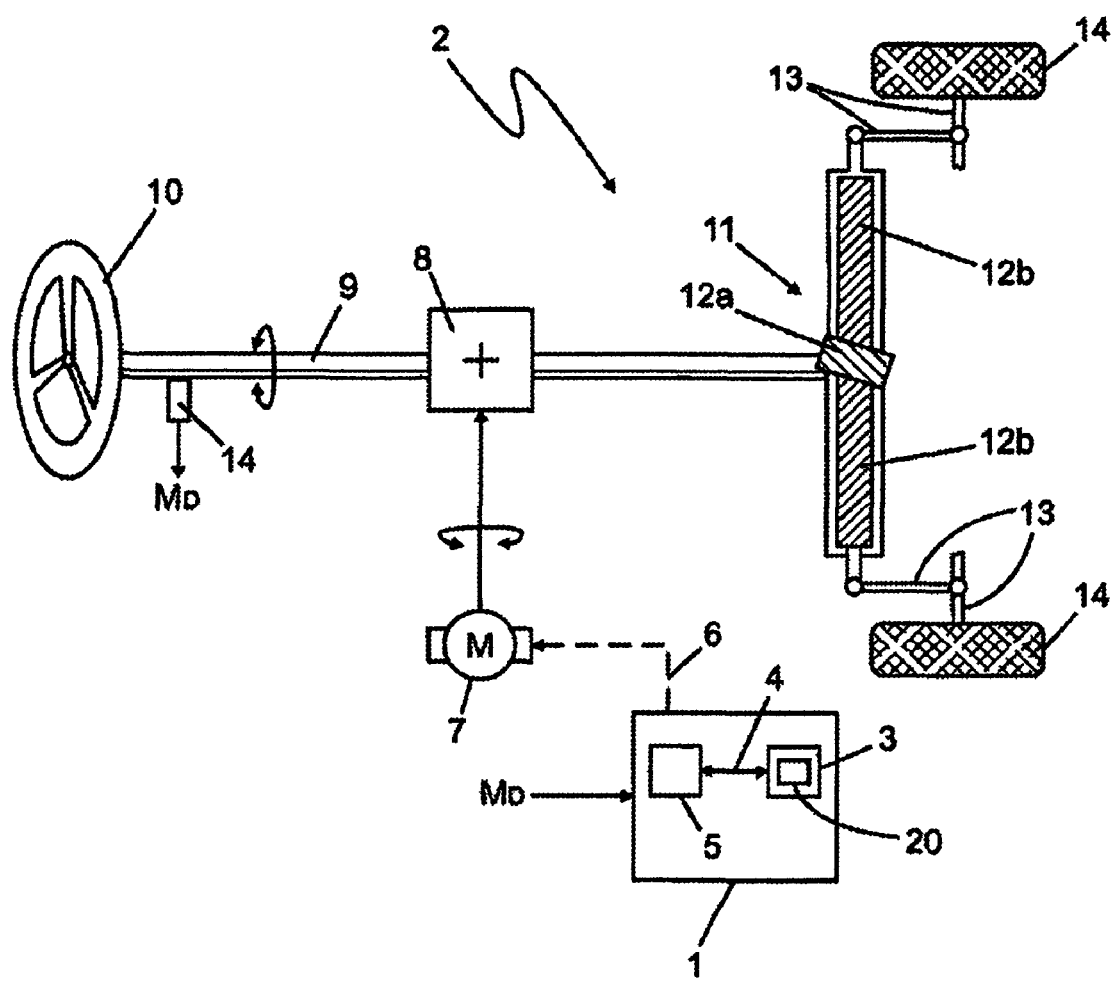
FIG. 1 is a schematic illustration of an electric steering system in a vehicle comprising a control device.

FIG. 1 shows a control device 1, which is associated with a steering system 2. A microprocessor 3 is disposed in the control device 1 and is connected via a data line 4, such as a bus system, to a memory element 5. The control device 1 is connected, via a signal line 6, to a torque control element 7, which is designed, for example, as an electric motor, allowing for control of the torque control element 7 by the control device 1. By way of a gear 8, the torque control element 7 acts on a torsion bar 9 on which a steering means, such as a steering wheel 10, is disposed.

The steering system 2 further comprises a steering gear 11 which is designed, for example, as a rack-and-pinion steering gear. As an alternative, the steering gear 11 can also be designed as a recirculating ball gear or as a ball-and-nut gear. The description hereafter primarily assumes a rack-and-pinion steering gear, wherein the steering gear comprises a pinion 12a and a toothed rack 12b, so that the torsion bar 9 cooperates with wheels 14 via the pinion 12a and the toothed rack 12b, by way of the steering linkage 13.

The steering system 2 further comprises a torque sensor 14 for detecting a torsion-bar torque $M_D$ and means (not shown) for transmitting the current torsion-bar torque $M_D$ to the control device 1.

The steering system 2 shown in FIG. 1 represents only one of a variety of possible embodiments of steering devices that are suitable for carrying out the method according to the invention. Other embodiments can be implemented, for example, by different steering gears, or by a different arrangement of the torque control element 7, or by additional torque control elements, such as additional electric motors. Moreover, the sensor 14 may be disposed in a different location.

An output feedback controller 20 is provided in the control device 1 and is implemented, for example, in the manner of a computer program and stored in the memory element 3. When the method according to the invention is carried out, the computer program implementing the output feedback controller 20 is executed on the microprocessor 3. The input that the output feedback controller 20 receives is at least the actual torsion-bar torque $M_D$ and a target torsion-bar torque $M_{D,ref}$. Depending on the input variables, the output feedback controller 20 determines an actuating variable $M_M$, which is transmitted, via the data line 6, to the electric motor 7 and allows the electric motor 7 to be actuated so as to establish the target torsion-bar torque $M_{D,ref}$.

Figure 2:
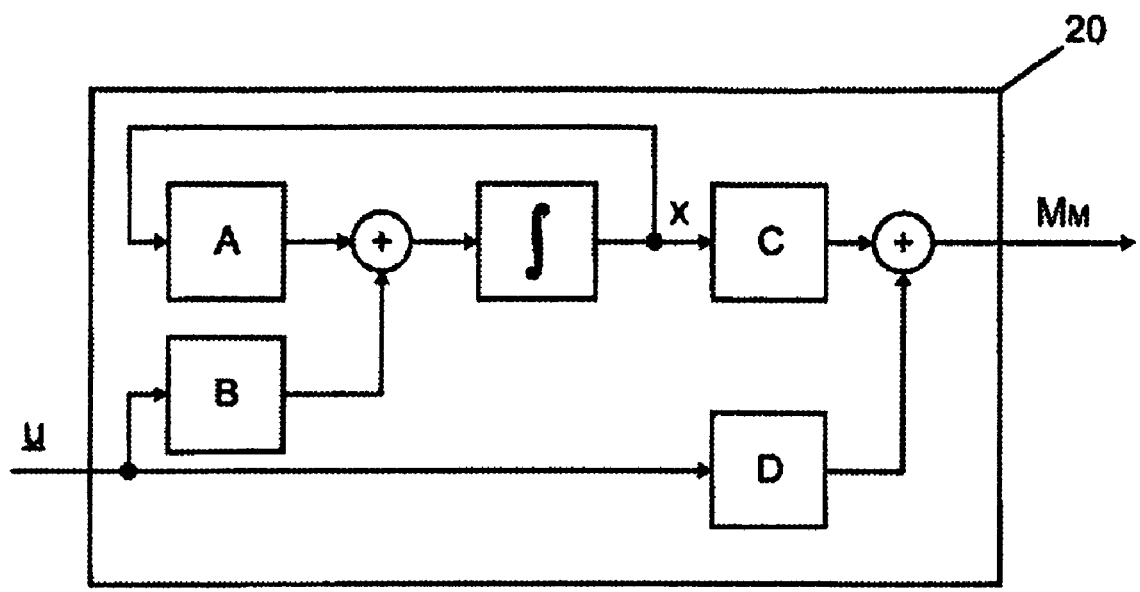
FIG. 2 is a schematic illustration of an output feedback controller according to the invention.

FIG. 2 shows a schematic view of a possible embodiment of the output feedback controller 20. The output feedback controller 20 satisfies a computing rule of the following form:

$$x_{r,k+1} = Ax_{r,k} + Bu_k$$

$$y_k = Cx_{r,k} + Du_k,$$

where $y_k$ is a vector that describes the currently required actuating variables, which is to say the actuating variable for actuating the torque control element 7.

$u_k$ is a vector that describes the current measured variables and the current target variables, these being at least the actual torsion-bar torque $M_D$ and the target torsion-bar torque $M_{D,ref}$.

$X_{r,k}$ is a vector that denotes the current internal state of the output feedback controller 20. The internal state of the output feedback controller 20 does not, of course, correspond to the state of the steering system 2, or of an analogous model of the steering system, which is used for determining disturbance variables in systems known from the prior art.

A, B, C and D denote controller matrices, which are determined by way of known design methods for output feedback controllers. In establishing the control matrices A, B, C and D, consideration is given to the fact that only certain variables are available, such as, for example, only the actual torsion-bar torque $M_D$.

The vector $u_k$ can notably also comprise the currently implemented actuating variable. This allows, for example, actuating variable limitations to be taken into account. The currently implemented actuating variable can notably be determined by an estimation of this variable, in which the estimation takes the limitations and special functions into consideration. Because the currently implemented actuating variable is provided to the output feedback controller 20, together with the vector $u_k$, as the input signal, it is also possible to take system-related actuating variable limitations into account. Likewise, reduced control element adjustment due to external requirements can be taken into consideration. Moreover, feedback of the currently implemented actuating variable also allows for external control of the control element, so as to implement desired manual torque beyond the measurement range of sensors provided for detecting the manual torque.

Figure 3:
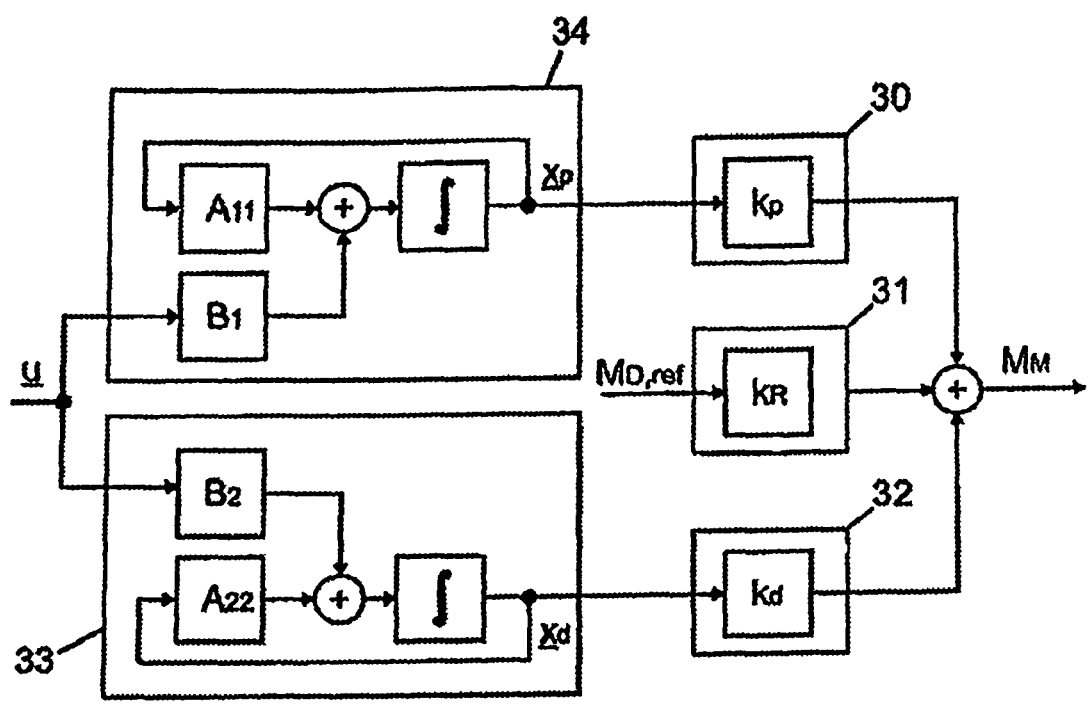
FIG. 3 is a schematic illustration of the known method for determining an assistance torque.

FIG. 3 shows a block diagram of the system known from DE 101 15 018 A1 for determining the assistance torque $M_M$. The known method initially determines a torque that would be required to generate torque-free steering by means of the state regulator 30. By means of a functional element 31, the target torsion-bar torque $M_{D,ref}$ is suitably amplified, and disturbance variables are suitably amplified by means of a functional element 32. The values determined by the functional elements 31 and 32 are then fed-forward to the torque that is required for torque-free steering.

The known system moreover comprises a disturbance variable observer 33 and a state observer 34. The known method thus implements an equation of the following form:

$$\begin{bmatrix} x_p \\ x_d \end{bmatrix}_{k+1} = \begin{bmatrix} A_{11} & 0 \\ 0 & A_{22} \end{bmatrix} \begin{bmatrix} x_p \\ x_d \end{bmatrix}_k + \begin{bmatrix} B_1 \\ B_2 \end{bmatrix} u_k$$

$$M_{M,k} = [K_p K_d] \begin{bmatrix} x_p \\ x_d \end{bmatrix} + K_r M_{D,ref,k}$$

In this equation, $u_k$ denotes the current measurement signals. The matrices $A_{11}$ and $B_1$ describe the behavior of the state observer 34. The matrices $A_{22}$ and $B_2$ describe the behavior of the disturbance variable observer 33. This equation already shows that, in the method known from the prior art, no comparison takes place between the target torsion-bar torque and actual torsion-bar torque, and thus the torsion-bar torque is not controlled.

As compared to the known method, the method according to the invention makes it easier to determine an actuating variable for adjusting a manual torque, wherein control of the torsion-bar torque that implements the manual torque is notably possible, allowing for particularly precise adjustment of the necessary actuating variable. Moreover, the method according to the invention does not require measured or estimated disturbance variables to be explicitly specified. Notably, the method according to the invention is not dependent on a model of the steering system, which must be employed in systems known from the prior art, for example, for estimating individual variables.

The invention claimed is:

1. A method for determining an actuating variable for actuating a torque control element in an electric vehicle steering system as a function of a predefined target torsion-bar torque (MD, ref), comprising:
   detecting an actual torsion-bar torque (MD);
   deriving a differential torque from the predefined target torsion-bar torque (MD,ref) and the actual torsion-bar torque (MD); and
   determining the actuating variable with an output feedback controller based on a function of the differential torque.

2. A method according to claim 1, wherein the actual torsion-bar torque (MD) is filtered, and instead of the actual torsion-bar torque (MD), the filtered actual torsion-bar torque (MD) is used to find the differential torque.

3. A method according to claim 1, wherein the target torsion-bar torque (MD,ref) is filtered, and instead of the target torsion-bar torque (MD,ref), the filtered target torsion-bar torque (MD,ref) is used to find the differential torque.

4. A method according to claim 1, wherein the actual torsion-bar torque (MD) and the target torsion-bar torque (MD, ref) are fed to the output feedback controller, and the differential torque is generated in the output feedback controller.

5. A method according to claim 1, wherein the actuating variable is additionally determined as a function of a current actuating variable.

6. A control device for controlling a steering system in a vehicle, the steering system comprising a torque control element, and the control device comprising means for actuating the torque control element by way of an actuating signal, and means for determining the actuating signal as a function of a predefined target torsion-bar torque (MD,ref), wherein the control device comprises means for finding a differential torque from the target torsion-bar torque (MD,ref) and an actual torsion-bar torque (MD); and an output feedback controller is provided in the control device, with an actuating variable being determined by means of the output feedback controller as a function of the differential torque.

7. A control device according to claim 6, wherein a filter element for filtering the actual torsion-bar torque (MD) is provided in the control device, and the control device comprises means for finding the differential torque from the filtered actual torsion-bar torque (MD), instead of the actual torsion-bar torque (MD).

8. A control device according to claim 6, wherein a filter element for filtering the target torsion-bar torque (MD,ref) is provided in the control device, and the control device comprises means for finding the differential torque from the filtered target torsion-bar torque (MD,ref), instead of the target torsion-bar torque (MD,ref).

9. A control device according to claim 6, wherein the output feedback controller comprises means for finding the differential torque.

10. A control device according to claim 6, wherein the actuating variable can additionally be determined as a function of a current actuating variable.

11. A non-transient computer-readable medium having a computer program product which can be executed on a control device for controlling a steering system, the control device comprising a microprocessor configured for executing the computer program product, wherein the computer program product programs the control device to carry out the method according to claim 1.

12. A non-transient computer-readable medium according to claim 11, wherein the computer program product is stored on a memory element.

* * * * *